United States Patent

Heron

[15] 3,660,148
[45] May 2, 1972

[54] TREATMENT OF ASBESTOS
[72] Inventor: Gordon F. Heron, Rochdale, England
[73] Assignee: Turner Brothers Asbestos Company Limited, Manchester, England
[22] Filed: Jan. 9, 1970
[21] Appl. No.: 1,665

[30] Foreign Application Priority Data

Jan. 10, 1969    Great Britain.........................1,579/69

[52] U.S. Cl. ...........117/126 AB, 117/161 UC, 117/161 UD, 117/162, 162/155, 161/92
[51] Int. Cl. ....................................B32b 19/02, B32b 19/08
[58] Field of Search...............117/126 AB, 161 UD, 161 UC, 117/162; 162/155; 161/92

[56] References Cited

UNITED STATES PATENTS 2,264,158   11/1941   Clark................................117/126 AB
2,568,144   9/1951   Cremer et al....................117/126 AB

FOREIGN PATENTS OR APPLICATIONS 591,327   1/1960   Canada............................117/126 AB Primary Examiner—William D. Martin
Assistant Examiner—D. Cohen
Attorney—Sughrue, Rothwell, Mion, Zinn & Macpeak

[57] ABSTRACT

The invention comprises treating asbestos cloth and other asbestos products to reduce the dust emitted by them during handling and use. This is done by distributing a small amount of polymeric particles throughout the product to bond the fibers to one another, while leaving the properties except the dustiness essentially unchanged. The preferred method consists in impregnating asbestos cloth with an aqueous emulsion or suspension of the polymeric material and removing the water.

6 Claims, 4 Drawing Figures

TREATMENT OF ASBESTOS

BACKGROUND OF THE INVENTION

1. Field of the Invention

This invention relates to the treatment of asbestos products.

2. Description of the Prior Art

In recent years the risk of contraction of asbestosis by people who make or handle asbestos products has been increasingly appreciated. This risk arises when asbestos dust is present in the atmosphere. Dust control is usually achieved in manufacturing processes by the use of ventilation, or by enclosing or shielding machinery, but the users of the manufactured products frequently work in unprotected atmospheres. For example, asbestos cloth used as insulation is often torn by the installers, and asbestos clothing is often roughly handled. Then short fibers fluff and fibrous particles are given off as dust into the atmosphere.

The suppression of asbestos dust is accordingly an acute problem. Coating the product is an obvious approach, but has not proved successful.

The most important requirements for the majority of asbestos products in normal use are that the products should give rise to the minimum of dustiness in normal handling (not necessarily tearing), that the flexibility and handling characteristics of the product should not be substantially impaired, and that the product should be compatible with materials subsequently applied to it, such as resin, rubber or paint. In short, the product, though treated to suppress dust, should not lose any of its natural characteristics other than that of giving off dust.

The most important asbestos products which it is desirable to treat for dust suppression are asbestos cloth of all kinds, which normally contain a small proportion (say 10 percent) of cotton or other organic fibers Other materials advantageously treated include slivers, yarns, tapes and rope.

A solution of the problem proposed some thirty years ago involved brushing a synthetic resin diluted with acetone onto the outside of a garment of asbestos cloth and, after evaporation of the acetone, baking the garment to toughen the resin. However, the application of a surface layer to asbestos cloth impairs the handle and flexibility of the cloth and in practice does not solve the problem, because dust in the interior of the cloth is still liable to escape, for example when the cloth is torn. As far as we are aware this old process has never come into use in practice.

To proof asbestos cloth with rubber or other material is also known, but this is no remedy, as the cloth is completely changed in handle, flexibility and appearance by the proofing.

SUMMARY OF THE INVENTION

I have surprisingly found that asbestos cloth and other products can be rendered substantially less dusty without essential modification of any other property of the cloth or other material if a suitable polymeric material is so introduced into the asbestos product as to bond as many as possible of the fibers to one another.

To be suitable, the polymeric material must have two essential properties. First, it must possess the ability to bond the fibers in the asbestos product, and a suitable criterion of this is film-forming ability, that is to say ability to form a coherent film on drying from solution, emulsion or dispersion. Second and most important, it must be flexible; a suitable criterion of flexibility is the extension at break of the material under the A.S.T.M. tensile test D 882–611 and under this test the polymeric material must have an extension to break of at least 10 percent, and preferably at least 50 percent. Advantageously the polymeric material is thermoplastic or elastomeric.

According to the invention at least the majority of the fibers in an asbestos product are bonded by particles of such a polymeric material distributed throughout the asbestos product in an amount of from 0.1 to 5 percent by weight of the product. This distribution can be effected by impregnating the asbestos product throughout with a dispersion, emulsion or solution of the polymeric material, and removing the continuous phase of the dispersion or emulsion or the solvent of the solution to leave polymer particles adherent to and bonding together at least the majority of the fibers at points of contact with other fibers. On the other hand, spreading a melt of the polymeric material on asbestos cloth is of no value, as it merely proofs the cloth.

DETAILED DESCRIPTION OF THE INVENTION

Figure 1:
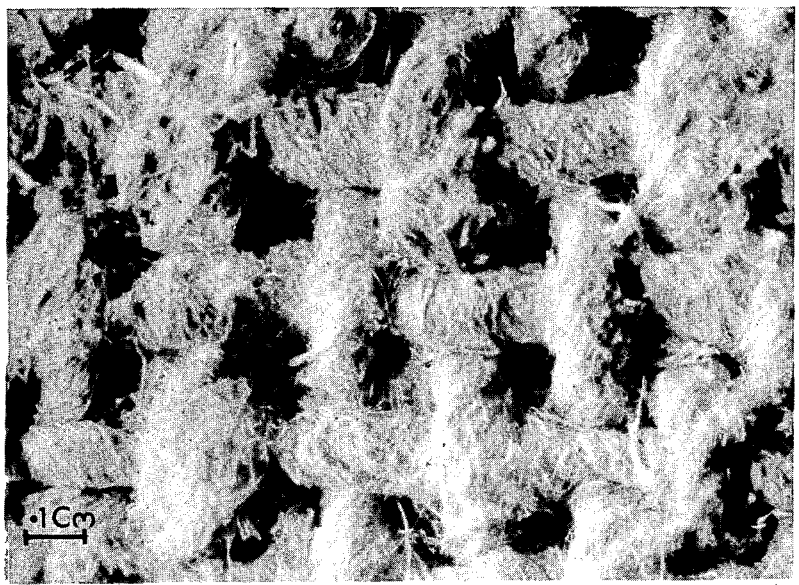

While a solution gives maximum penetration and bonding of the asbestos, the most suitable polymeric materials are not water-soluble, and the use of organic solvents leads to problems in solvent recovery. Preferably, therefore, the polymeric material is applied in the form an aqueous dispersion or emulsion. A particularly advantageous process comprises immersing the asbestos product in an aqueous emulsion or dispersion, e.g. by passing it through a bath of the emulsion or dispersion, mechanically expressing water from the material, e.g. by passing it between two rolls, and then drying it, e.g. by passing it through a dryer. To ensure uniform distribution of the polymeric material in the asbestos product, its concentration in the dispersion or emulsion should be low, preferably no more than 5 percent by weight and better still no more than 2 percent.

What is required is that the pick-up of the polymeric material shall be from 0.1 to 5 percent weight of the asbestos product, and preferably from 0.5 to 3 percent by weight, and the concentration of the polymeric material, the duration of the immersion, the amount of water expressed, and the nature of the cloth or other asbestos product must be correlated to give the desired pick-up.

Asbestos slivers or yarn may be impregnated by passage over a damping roller which dips into a bath of a dispersion or emulsion; in this case the concentration of the polymeric material may be higher, say up to 10 percent.

Polymeric materials of very different chemical compositions have been found to give satisfactory results, though some such as polyvinyl acetate must be plasticized if they are to have the required extension to break without which satisfactory results are not obtained. Suitable polymeric materials with their approximate percentage elongations at break include polyvinyl acetate plasticized with 20 percent dibutyl phthalate (450 percent), terpolymers of vinyl acetate, unsaturated acid and vinyl caprate (300 percent), copolymers of vinyl acetate and 25% 2-ethyl-hexyl-acrylate (320 percent), plasticized polyvinyl chloride (50 percent), copolymers of vinyl acetate and an acrylate and copolymers of styrene and an acrylate, (which are too soft to test for extension), natural rubber latex (2,000 percent), styrene-butadiene rubber latex (2,000 percent) and neoprene (1,500 percent). In contrast unplasticised polyvinyl acetate (8 percent) renders the product stiff and harsh to handle, as do emulsions of polystyrene (3 percent) and emulsioms of phenol-formaldehyde resins (3 percent). These polymeric materials so modify properties of the product as to be of no value.

Figure 2:
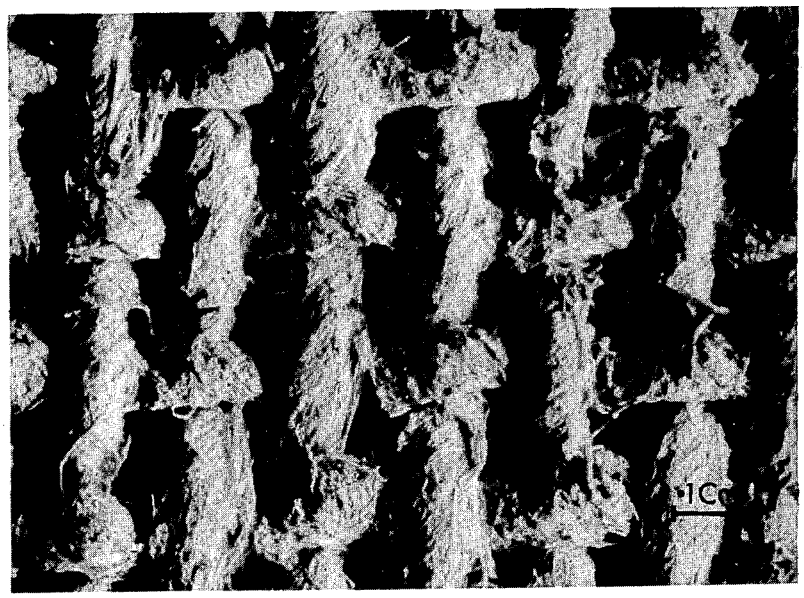

In the drawings,

FIGS. 1 and 2 are photomicrographs of, respectively, untreated asbestos cloth and asbestos cloth treated according to the invention.

Figure 3:
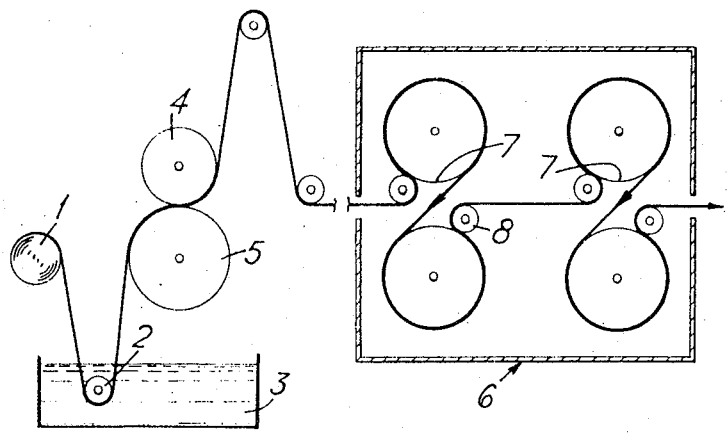
Figure 4:
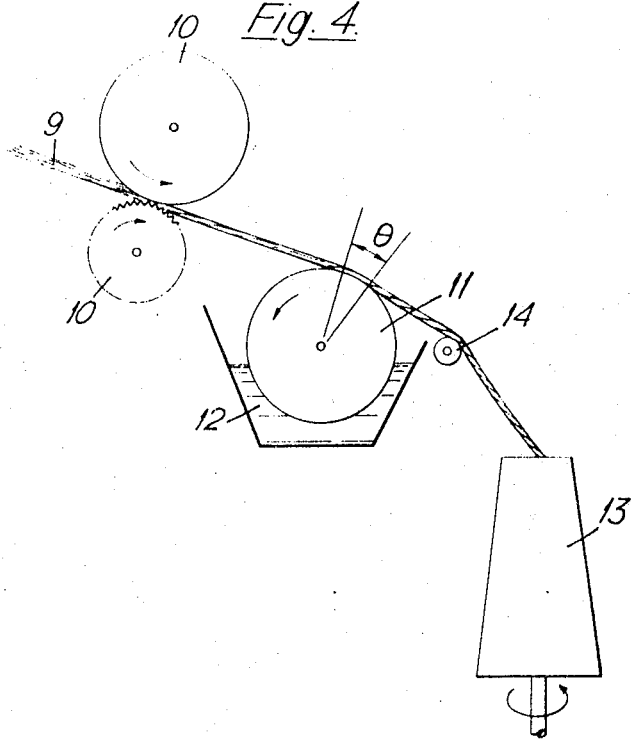

FIGS. 3 and 4 diagrammatically show two ways by which asbestos products can be treated according to the invention.

Referring to FIG. 3, a roll of asbestos cloth 1 is unwound to pass round a roller 2 in a bath 3 containing an emulsion or dispersion of the polymer, and leaves the bath to pass between rollers 4 and 5 which express liquid from it, this liquid dropping back into the bath. The impregnated cloth then travels through a dryer 6, which is essentially formed by a housing for four cylinders 7 internally steam-heated to and from which the cloth is guided by rollers 8.

Some examples of the treatment of different asbestos cloths in apparatus such as that diagrammatically shown in FIG. 3 will now be given.

EXAMPLE 1

A general purpose asbestos cloth, weighing 28 ounces per square yard with a plain weave was passed at 80 feet per minute through an emulsion of a copolymer of vinyl acetate and maleic ester containing 1.7 percent solids by weight. The amount of liquid left in the cloth after passing through the rollers 4 and 5 was 45 percent by weight of the cloth. The cloth emerged dry from the dryer 6 and contained 0.7 percent dry polymer by weight. The suppression of dust and the general handling characteristics were both excellent.

EXAMPLE 2

A further roll of the same cloth as in Example 1 was treated in the same way by passage through a bath of an emulsion of methacrylic ester homopolymer. The pick-up of the polymer was 0.7 percent. The dust suppression was excellent, but the handle was not quite so good.

EXAMPLE 3

An asbestos cloth weighing 78 ounces per square yard with a twill weave, normally used for insulating lagging, was treated exactly as in Example 1, but the amount of liquid left in the cloth after passing through the rollers 4 and 5 was 50 percent by weight. The pick-up was 0.8 percent. The results were as good as in Example 1.

EXAMPLE 4

Equally good results were obtained on the cloth used in Example 3 when the emulsion of the copolymer was replaced by natural rubber latex.

EXAMPLE 5

A cloth weighing 36 ounces per square yard with a plain weave was treated with a styrene-butadiene rubber latex, the pick-up being 0.6 percent. The dust suppression and handle were both excellent.

EXAMPLE 6

The same cloth as in Example 5 was treated in the same way with an emulsion of a copolymer of styrene and an acrylic acid ester, the pick-up being again 0.8 percent by weight. The dust suppression was excellent, but the treated cloth, though satisfactory, was a little stiffer.

EXAMPLE 7

The same cloth as in Example 1 was treated with an emulsion of polyvinyl chloride plasticized with 15 percent tricresyl phosphate, the pick-up being 0.7 percent. The dust emission was much reduced, but the improvement was not as great as in Example 1.

EXAMPLE 8

Example 1 was repeated with neoprene latex as the polymeric material. The dust suppression was good, but the product became stiffer and discoloured with age, so neoprene is most suitable only when the product is to be used shortly after treatment.

In contrast, when the cloth of Example 1 was treated with an emulsion of a phenolic resin of 2 percent concentration by weight, with a pick-up of 1 percent, the dust suppression was poor and the cloth became excessively stiff and harsh. When the same cloth was treated with an emulsion of unplasticised polyvinyl acetate to give a pick-up of 0.8 percent there was no significant improvement in dust emission, and the cloth was unacceptably stiff and harsh.

A practical test for the emission of dust is "mark-off," that is to say the appearance of fibers on a dark cloth against which the product is rubbed. Untreated asbestos products leave numerous small fibers on the cloth, whereas products of Examples 1 to 8 mark the cloth to a very much smaller extent.

Since dust may be produced by normal handling, which includes chafing and flexing, or by tearing, tests have been devised to enable comparisons to be made. The number of fibers in air can be measured both by a Royco electro-optical particle counter, and by collecting the fibers on a membrane filter and counting them under an optical microscope. In chafing tests a sample of cloth is repeatedly drawn through a right-angle across the edge of a metal plate inside a box through which air flows, and the fibers carried out of the box are assessed. The results can be expressed as fibrous particles per cc of air (p/cc). In the tearing tests a mechanism in the same box is externally operated to tear cloth.

The results of such tests on both the untreated and the untreated cloths of Examples 1, 2, 5, 6 and 8 are given below.

| Cloth | Chafing Test p/cc Royco | Tearing Test p/cc Royco |
|---|---|---|
| Untreated cloth of Examples 1 and 2 | 7.8 | 53.5 |
| Example 1 | 0.17 | 13.1 |
| Example 2 | 0.2 | 9.0 |
| Example 8 | 0.25 | 14.0 |
| Untreated cloth of Examples 5 and 6 | 2.7 | 46.1 |
| Example 5 | 0.22 | 11.5 |
| Example 6 | 0.25 | 12.0 |

As an indication of the reduction of dust in practice, specimens of the untreated cloth of Example 1, the cloth as treated in that example, and the same cloth treated with natural rubber latex were torn and then fitted round a steam pipe. Samples of the air were taken during the tearing processes, and continuous air samples were taken during the fitting and sewing of the cloth in position. The Table below shows the results obtained.

| Cloth | During Tearing p/cc | During Fitting and Sewing p/cc |
|---|---|---|
| Untreated Cloth | 61.0 | 6.0 |
| Cloth treated as in Example 1 | 8.6 | 2.2 |
| Cloth treated with natural rubber latex | 6.0 | 2.3 |

That the treatment according to the invention does not interfere with post-treatments of the cloth is shown by a test in which untreated cloth of the kind used in Examples 5 and 6 and the same cloth treated with natural rubber latex according to the invention were proofed with rubber, and then pieces of the proofed cloths were plied together under heat and pressure. The resultant laminates were then tested for strength between the plies by a peeling test. It was found that the laminate produced from the cloth treated according to the invention resisted peeling better than the laminate produced from the untreated cloth.

FIG. 4 diagrammatically shows the impregnation of asbestos sliver as it passes through a spinning frame.

The asbestos sliver, shown at 9, passes between rollers 10 and then over a damping roller 11 which dips into a bath 12 of a dispersion or emulsion of the polymeric material and from this to a flyer frame package 13 shown purely diagrammatically. In passing from the bath to the package 13 the sliver passes over a bar 14, the position of which determines the angle of contact $\theta$ between the damping roller 11 and the partially twisted sliver. The twist runs back from the package 13 to the rollers 10 with the result that the sliver is rotating while in contact with the roller 11, the uniformity of impregnation being accordingly improved.

The advantage obtained by means of the invention is shown by dust measurements made in the atmosphere close to a spinning frame in which asbestos sliver was impregnated with an emulsion of the copolymer of polyvinyl acetate and maleic ester of 8 percent concentration, and also when more of the same untreated sliver passes to the frame. The pick-up of the copolymer was 0.5 percent by weight of the sliver. The Royco measurement in p/cc was 1.0 for the untreated sliver but only 0.35 for the treated sliver.

The yarns spun in the frame were tested for dust emission by being wound from the spinning bobbins into cheeses in a box of the kind used for the chafing and tearing tests. During the winding, the Royco counts in p/cc air were 2.8 for the untreated yarn, but only 0.65 for the treated yarn. Moreover, the treated yarn, except for the improvement in dust emission, was essentially similar to the untreated yarn.

An important property of asbestos cloth is inflammability. Since the process according to the invention introduces a combustible product into the cloth, it might be thought that there would be an adverse effect on inflammability. In fact, the difference is negligible.

Asbestos cloth according to the invention presents the additional advantages that it is of improved appearance and improved weave stability, and that when cut it frays less than similar untreated cloth.

I claim:

1. An asbestos product rendered substantially less dusty without essential modification of any other property by particles of a film-forming polymeric material having an extension to break of at least 50 percent, distributed throughout the product in an amount of from 0.1 to 5 percent by weight of the product and bonding at least the majority of the fibers at points of contact with other fibers.

2. The product of claim 1 in the form of asbestos cloth.

3. A product according to claim 1 in which the polymeric material is a thermoplastic or elastomeric material.

4. A product according to claim 1 in which the polymer particles amount to from 0.5 to 3 percent by weight of the product.

5. A product according to claim 1 in which the polymeric material is a copolymer of vinyl acetate and maleic ester.

6. A product according to claim 1 in which the polymeric material is natural rubber or styrene-butadiene rubber.

* * * * *